United States Patent Office 3,109,861
Patented Nov. 5, 1963

3,109,861
PROCESSES AND INTERMEDIATES FOR CYCLIC KETONES
Waldemar Guex, Bottmingen, Roman Marbet, Riehen, and Marc Montavon, Basel, Switzerland, assignors to Hoffmann-La Roche Inc., Nutley, N.J., a corporation of New Jersey
No Drawing. Filed Nov. 23, 1959, Ser. No. 854,578
Claims priority, application Switzerland Dec. 17, 1958
7 Claims. (Cl. 260—587)

This invention relates to novel processes and novel intermediates for making nuclearly unsaturated ionones, i.e., compounds of the class consisting of α-ionone and homologs thereof, represented collectively by general Formula VI in the flowsheet below, and β-ionone and homologs thereof, represented collectively by general Formula VII in said flowsheet.

A quick survey of the invention may be had upon reference to the following flowsheet, wherein each of the symbols R represents a member selected from the group consisting of hydrogen and lower alkyl radicals, and each of the symbols R' represents a lower alkyl radical.

FLOWSHEET

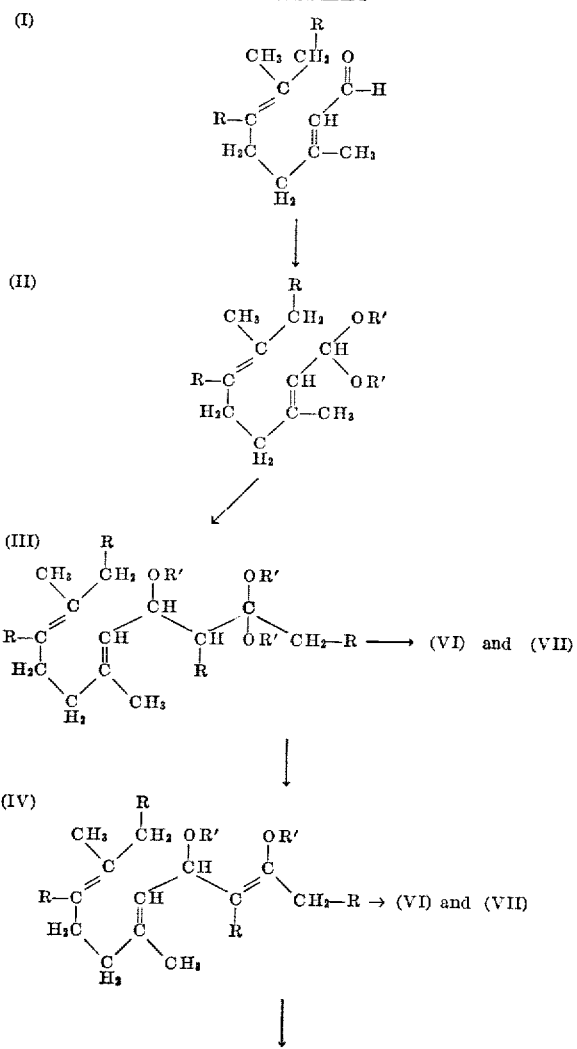

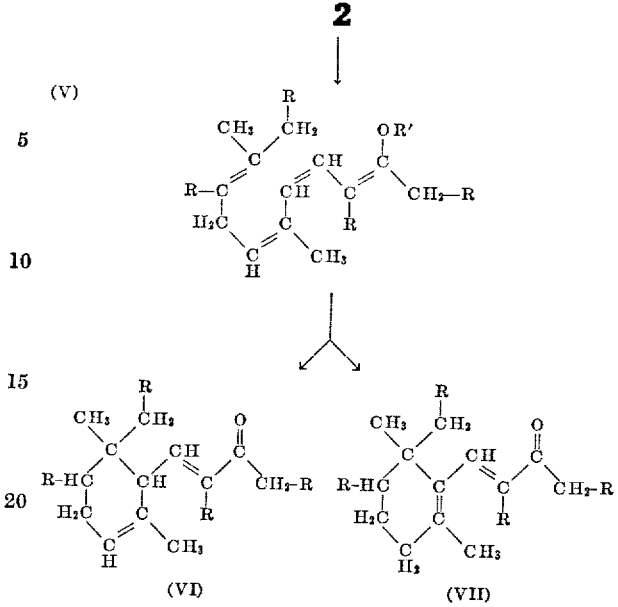

As intimated above, the end products obtainable by processes of the invention are represented in the flowsheet by general Formulas VI and VII. The products of Formulas VI and VII are generically known compounds, and accordingly invention is not herein claimed as to these products per se. As is known, compounds of Formulas VI and VII are useful (among other applications) for the compounding of perfume compositions, and as intermediates in the preparation of products having utility in the pharmaceutical and perfume industries.

In one of its broad aspects, the invention provides a process of making a nuclearly unsaturated ionone which comprises treating with an acidic cyclizing agent a compound represented by general Formulas III or IV or V. Suitable acidic cyclizing agents for use in the above process include acidic materials such as are known to be useful in prior art processes of cyclizing pseudoionone and its homologs to the corresponding ring-closed products of the α- and β-ionone series. Such acidic cyclizing agents include, for instance, phosphoric acid and sulfuric acid. The proportion of α- to β-isomer in the cyclized products obtained by the processes of the invention depends upon the nature and concentration of the specific acidic cyclizing agent employed, and upon the reaction conditions, principally the temperature of the reaction. Thus, cyclized products having practically exclusively the α-ionone structure can be obtained by employing syrupy phosphoric acid as the cyclizing agent at room temperature.

Although, as shown in the flowsheet, the compounds of Formula III can be cyclized directly to yield compounds of Formulas VI and VII, a preferred mode of procedure comprises subjecting said compounds of Formula III to a dealcoholation reaction to effect the splitting out of one or two mols of alcohol R'OH (wherein R' has the same significance as defined above), prior to the cyclization reaction. By said dealcoholation reaction, there are formed compounds of general Formula IV upon splitting out the first mol of alcohol R'OH, and compounds of general Formula V upon splitting out the second mol of alcohol R'OH. Whereas the compounds of Formulas IV and V, respectively, can be isolated separately, it is often advantageous to carry out the dealcoholation reaction so as to obtain a mixture of compounds IV and V, which can then be subjected as a mixture to cyclization. On the other hand, the invention also includes processes of cyclizing compounds of Formula IV separately from compounds of Formula V.

A procedure which has been found suitable for effecting the dealcoholation of compounds III to produce compounds IV and V, and mixtures of IV and V, comprises heating compounds of Formula III in a solvent and in the presence of an acidic material. Suitable acidic dealcoholation agents include, for example, p-toluenesulfonic acid, metaphosporic acid, and orthophosphoric acid. It is often advantageous to add to the reaction mixture a small amount of an organic base, e.g., quinoline or pyridine. In a preferred mode of execution, the dealcoholation reation is effected at the boiling temperature of the reaction mixture, while continuously distilling alcohol R'OH split out during the reaction.

The starting materials shown in the flowsheet are compounds represented collectively by general Formula I. These compounds comprise the aldehyde citral and certain homologs thereof. As a class, the starting materials of Formula I are known substances, the preparation of which will be apparent to those skilled in the art and therefore need not be further described herein.

The compounds of general Formula II in the flowsheet can be made from the aldehydes of Formula I by conventional processes of acetalization, which likewise will be apparent to those skilled in the art and need not be described in detail in this specification.

The compounds of general Formula III can be prepared by condensing compounds of Formula II with compounds represented by the general formula (VIII) 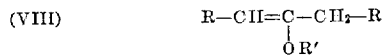

wherein each of the symbols R represents hydrogen or a lower alkyl radical and the symbol R' represents a lower alkyl radical. The condensation reaction is suitably effected by reacting a compound of Formula II with a compound of Formula VIII in the presence of an ansolvo acid (or "Lewis acid") condensing agent, e.g. zinc chloride, boron trifluoride or the like. Specific examples of the class of compounds represented by general Formula III which are useful in the practice of the invention include 6,10-dimethyl - 2,2,4 - triethoxy-5,9-undecadiene, 6,9,10-trimethyl - 2,2,4 - triethoxy - 5,9 - undecadiene, 3,6,10-trimethyl - 2,2,4 - triethoxy - 5,9 - undecadiene, 3,6,9,10-tetramethyl-2,2,4-triethoxy-5,9-undecadiene, 6,10-dimethyl-2,2,4-trimethoxy-5,9-dodecadiene, 6,10,12 - trimethyl-2,2,4-triethoxy-5,9-tridecadiene, 3,6,10,12 - tetramethyl-2,2,4-triethoxy-5,9-tridecadiene, and the like.

The invention is further disclosed in the following examples, which are illustrative but not limitative thereof. All temperatures are in degrees centigrade.

*Example 1*

235 g. of dry lemon grass is mixed with 160 g. of orthoformic acid ethyl ester (ethyl orthoformate) and then combined with a solution of 3 g. of crystalline orthophosphoric acid in 40 g. of absolute alcohol. The reaction mixture is cooled with ice water to a temperature between 20° and 25°, the reaction vessel is closed, and allowed to stand overnight at room temperature. On the following day the dark brown solution is mixed with 1000 ml. of petroleum ether having a boiling range of 30–45° and then is washed, first with 1000 ml. of ice water and then with 1000 ml. of saturated sodium bicarbonate solution. The organic phase is dried over sodium sulfate and freed of solvent by evaporation at 40° under a water pump vacuum. Crude citral acetal remains as a brown oil, and is purified by distillation. There is thus obtained 200 g. of the purified acetal as a slightly yellow oil boiling at 76–78°/0.2 mm. ($n_D^{20}=1.4528$).

The purified citral acetal (22.6 g.) is mixed with 10 g. of 2-ethoxy-1-propene and then added in portions to a solution of 1 g. of zinc chloride in 10 ml. of ethyl acetate. The reaction mixture is cooled in order to keep the temperature from rising above 40°. When the reaction has subsided, the mixture is allowed to stand for one hour at room temperature and then it is combined with 1000 ml. of petroleum ether. The mixture is washed with ice water and sodium bicarbonate solution, the washed petroleum ether solution is dried, and freed of solvent in a water pump vacuum. There is thus obtained 28 g. of 6,10-dimethyl-2,2,4-triethoxy-5,9-undecadiene as a yellow oil having $n_D^{20}=1.4566$.

32 g. of 6,10-dimethyl-2,2,4-triethoxy-5,9-undecadiene prepared by the method described above is dissolved in 300 ml. of benzene. pToluenesulfonic acid (0.3 g.) quinoline (1.5 ml.) and hydroquinone (0.05 g.) are added and the mixture is heated at its boiling temperature while continuously distilling the ethanol split off by the reaction. After about 30 minutes, the boiling temperature of the reaction mixture has climbed at 80°. The reaction mixture is poured onto ice and sodium bicarbonate solution and the organic phase which separates is washed several times with cool water. After distillation in vacuo there is obtained a mixture comprising principally 6,10-dimethyl-2-ethoxy-2,4,6,9-undecatetraene ($n_D^{24}=1.5360$; U.V. max. in ethanol at 284 mμ, $E_1^1=800$).

The product mixture last mentioned is dissolved in 25 ml. of benzene and added to 80 ml. of 84% phosphoric acid while stirring vigorously. The temperature climbs quickly to 35–40°. The mixture is allowed to react for an additional period of 30 minutes and then is poured onto ice and water. The organic phase is taken up in petroleum ether, the petroleum ether solution is washed with water, then with sodium bicarbonate solution and then again with water to neutrality. Upon drying of the solution, evaporation of the solvent, and fractional distillation of the residue, there is obtained practically pure α-ionone (B.P. 60–65°/0.02 mm.; $n_D^{24}=1.4995$; U.V. max. in ethanol solution at 226 mμ, $E_1^1=700$). A slight absorption can be observed at 290 mμ, signifying the presence of an insignificant amount of β-ionone.

*Example 2*

600 g. of ε-methylcitral is acetalized with 600 g. of ethyl orthoformate in the presence of 10 g. of 85% phosphoric acid and 100 ml. of absolute ethanol, according to the indications in Example 1. The reaction mixture is worked up, yielding 850 g. of ε-methylcitral acetal as a pleasant smelling oil ($n_D^{20}=1.4721$; $d=0.882$).

30 g. of the latter acetal are reacted with 13.5 g. of 2-ethoxy-1-propene in the presence of 1.35 g. of zinc chloride and 13.5 ml. of ethyl acetate, according to the indications in Example 1, yielding 40 g. of 6,9,10-trimethyl-2,2,4-triethoxy-5,9-undecadiene as a yellow oil having $n_D^{20}=1.4733$; $d=0.893$.

33.4 g. of 6,9,10-trimethyl-2,2,4-triethoxy-5,9-undecadiene is treated with 300 ml. of benzene, 0.2 g. of p-toluenesulfonic acid, 1.5 ml. of quinoline and 0.05 g. of hydroquinone according to the indications in Example 1. Upon working up there is obtained 28 g. of a crude product which is purified by distillation in a high vacuum (B.P. 100–110°/0.05 mm.; $n_D^{20}=1.5200$; U.V. max. in ethanol solution at 284.5 mμ; $E_1^1=1000$).

Cyclization of this product with 84% phosphoric acid according to the indications in Example 1 yields highly pure α-ionone (B.P. 68–70°/0.05 mm.; $n_D^{23}=1.4975$; U.V. max. in ethanol solution at 226 mμ, $E_1^1=670$).

*Example 3*

140 g. of citral acetal are mixed with 70 g. of 2-ethoxy-2-butene, and to the mixture is added in portions a solution of 7 g. of zinc chloride in 70 ml. of ethyl acetate. The reaction mixture is cooled with ice to keep the temperature below 40°. As soon as the reaction has ceased, the reaction mixture is allowed to stand at room temperature for one hour, and 3,6,10-trimethyl-2,2,4-triethoxy-5,9-undecadiene is isolated according to the indications in Example 1. By chromatography upon aluminum oxide (activity grade II, deactivated with 4% water and 1% pyridine) there is obtained analytically pure 3,6,10-trimethyl-2,2,4-triethoxy-5,9-undecadiene as a colorless oil having $n_D^{20} = 1.4550$.

33.4 g. of 3,6,10-trimethyl-2,2,4-triethoxy-5,9-undecadiene, 300 ml. of benzene, 0.3 g. of p-toluenesulfonic acid, 1.5 ml. of quinoline and 0.05 g. of hydroquinone are reacted according to the indications in Example 1, yielding 26.4 g. of a product which comprises mainly 3,6,10-trimethyl-2-ethoxy-2,4,6-undecatetraene.

This product, without further purification, is cyclized with phosphoric acid according to the indications in Example 1. By fractional distillation of the cyclized product there is obtained isomethyl-α-ionone (B.P. 66–68°/0.02 mm.; $n_D^{25} = 1.4960$; U.V. max. at 230 m$\mu$; $E_1^1 = 600$, shoulder at 290 m$\mu$).

*Example 4*

3,6,10-trimethyl-2,2,4-triethoxy-5,9-undecadiene (16.7 g.) is dissolved in 180 ml. of benzene. Orthophosphoric acid (0.25 g.) and hydroquinone (0.05 g.) are added and the reaction mixture is heated to 85° while stirring and continuously distilling off the alcohol which is split out. Working up the reaction mixture according to the indications in Example 1 yields a yellowish oil comprising mainly 3,6,10-trimethyl-2-ethoxy-2,4,6,9-undecatetraene (B.P. 90–100°/0.02 mm.; $n_D^{22} = 1.5100$; U.V. max. 282 m$\mu$, $E_1^1 = 950$). This is cyclized in the manner described in the preceding example.

We claim:

1. A compound represented by the general formula

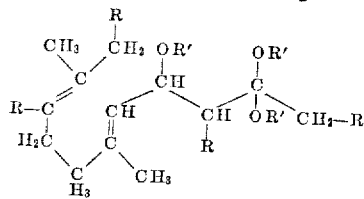

wherein each of the symbols R represents a member selected from the group consisting of hydrogen and lower alkyl radicals and each of the symbols R' represents a lower alkyl radical.

2. A compound represented by the general formula

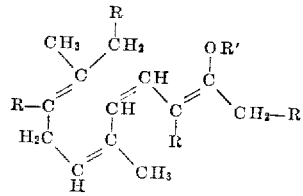

wherein each of the symbols R represents a member selected from the group consisting of hydrogen and lower alkyl radicals and the symbols R' represents a lower alkyl radical.

3. 6,10-dimethyl-2,2,4-triethoxy-5,9-undecadiene.
4. 6,9,10-trimethyl-2,2,4-triethoxy-5,9-undecadiene.
5. 3,6,10-trimethyl-2,2,4-triethoxy-5,9-undecadiene.
6. 6,10-dimethyl-2-ethoxy-2,4,6,9-undecatetraene.

7. A process of making a nuclearly unsaturated ionone which comprises treating with an acidic cyclizing agent selected from the group consisting of phosphoric acid, m-phosphoric acid, o-phosphoric acid, sulfuric acid, and p-toluene sulfonic acid, a compound represented by the general formula

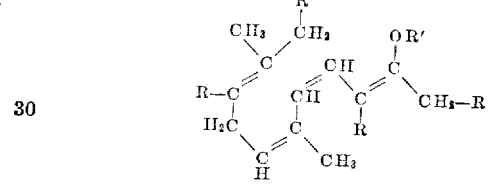

wherein each of the symbols R represents a member selected from the group consisting of hydrogen and lower alkyl radicals and the symbol R' represents a lower alkyl radical.

References Cited in the file of this patent

UNITED STATES PATENTS 2,730,549    Isfer et al.   ————————  Jan. 10, 1956
2,912,468    Copenhaver  ————————  Nov. 10, 1959

OTHER REFERENCES

Royals: Advanced Organic Chemistry (1956) p. 328.

UNITED STATES PATENT OFFICE
CERTIFICATE OF CORRECTION

Patent No. 3,109,861                      November 5, 1963

Waldemar Guex et al.

It is hereby certified that error appears in the above numbered patent requiring correction and that the said Letters Patent should read as corrected below.

Column 3, line 58, after "grass" insert -- oil --; column 4, line 15, for "pT-oluenesulfonic" read -- p-Toluenesulfonic --; line 67, for "α-ionone" read -- α-irone --; column 5, lines 35 to 42, the lower left-hand portion of the formula, for

Signed and sealed this 12th day of May 1964.

(SEAL)
Attest:

ERNEST W. SWIDER                      EDWARD J. BRENNER
Attesting Officer                  Commissioner of Patents